Patented July 10, 1923.

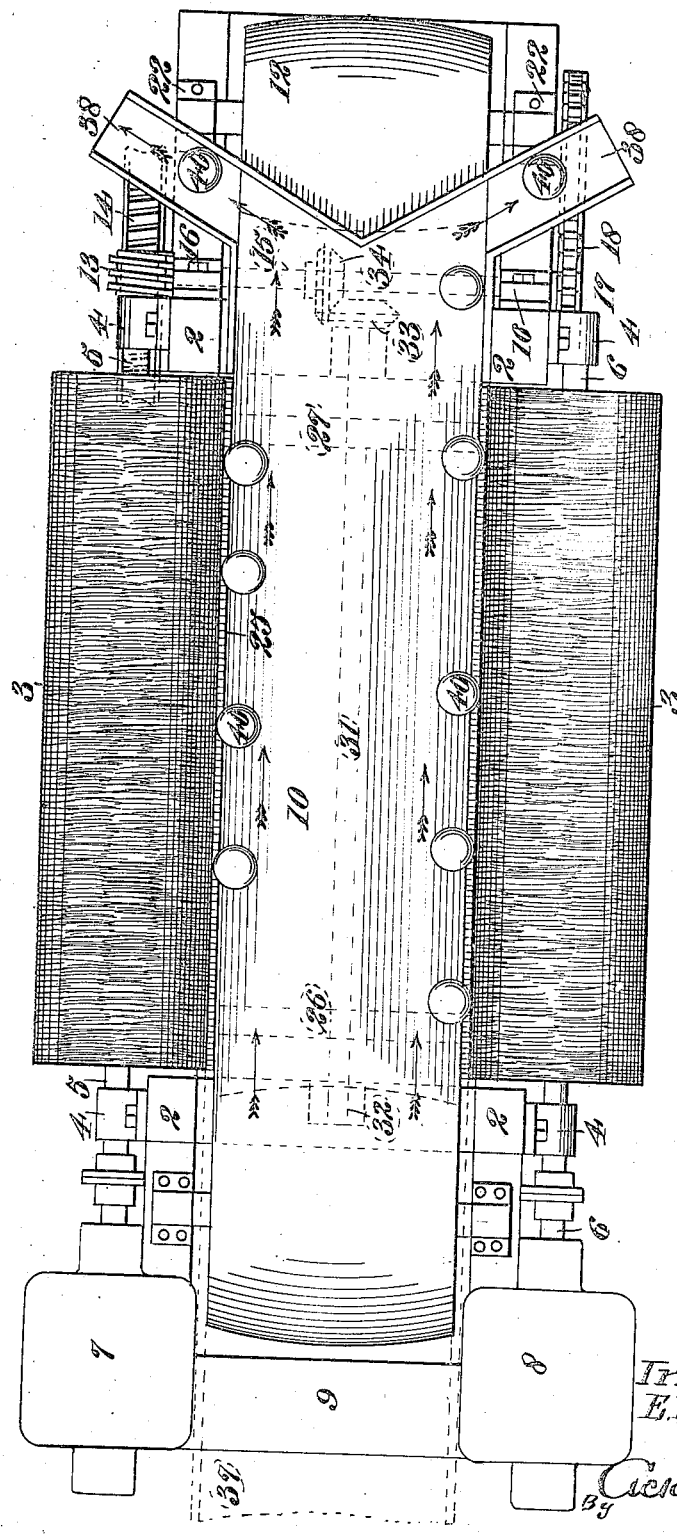

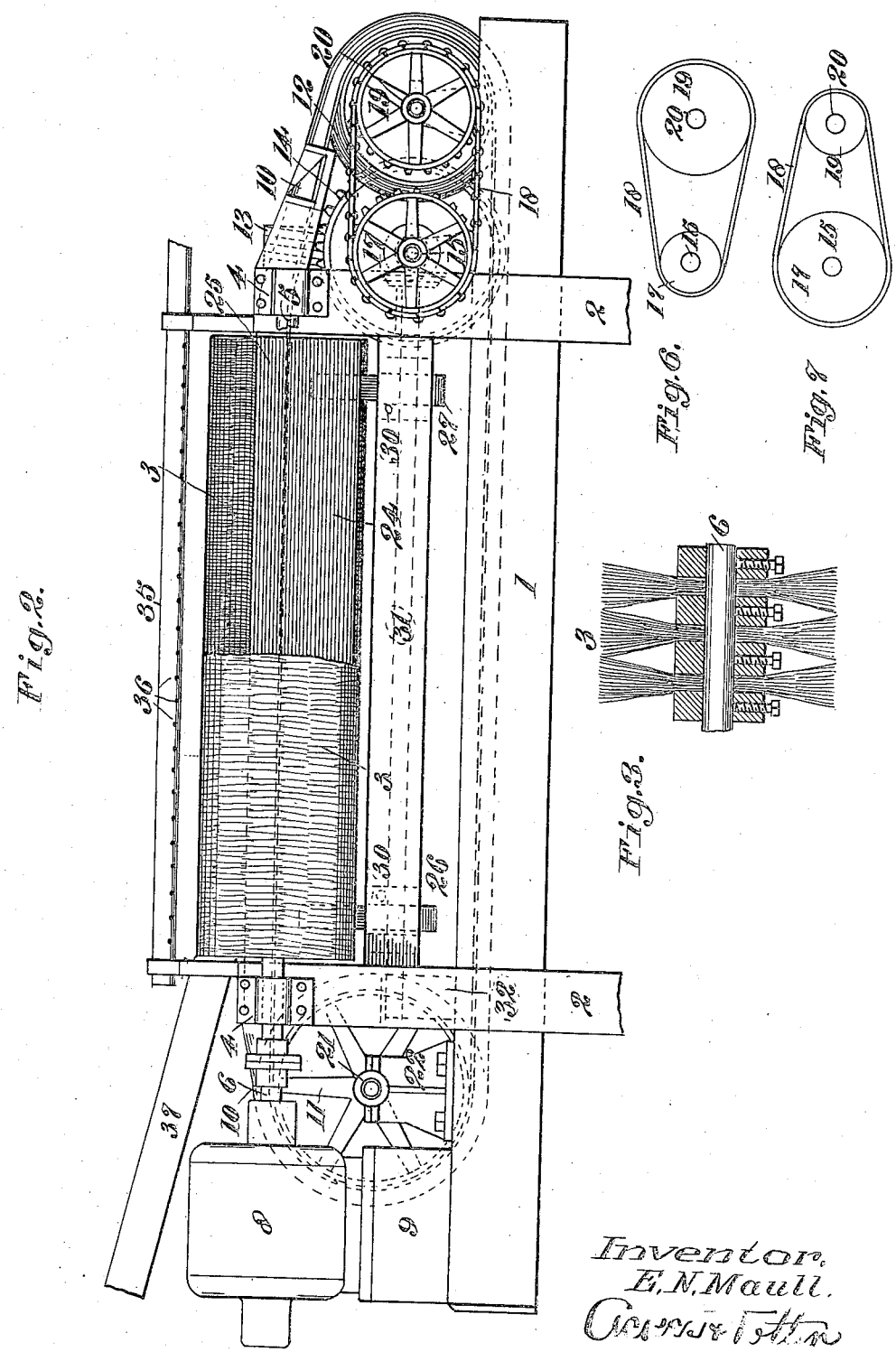

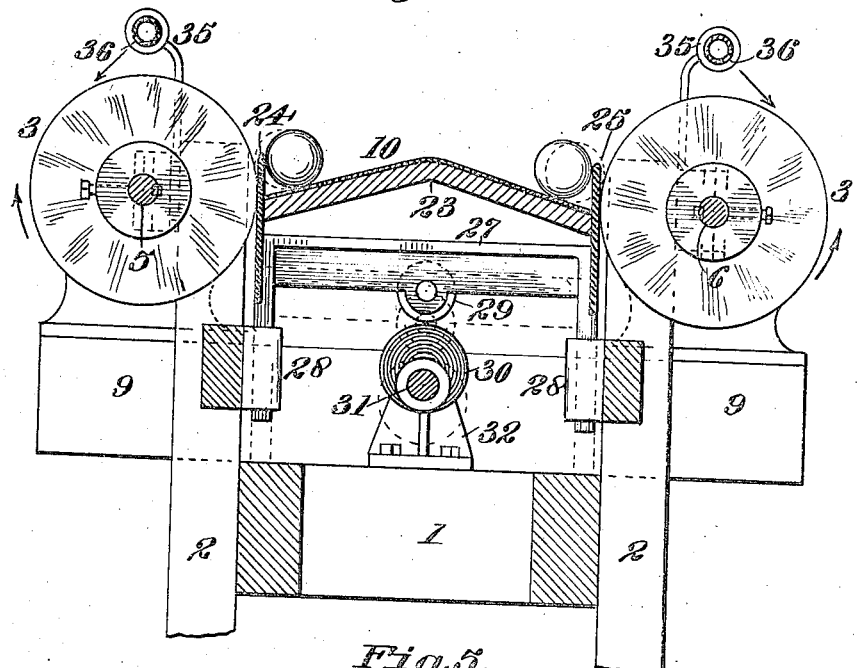
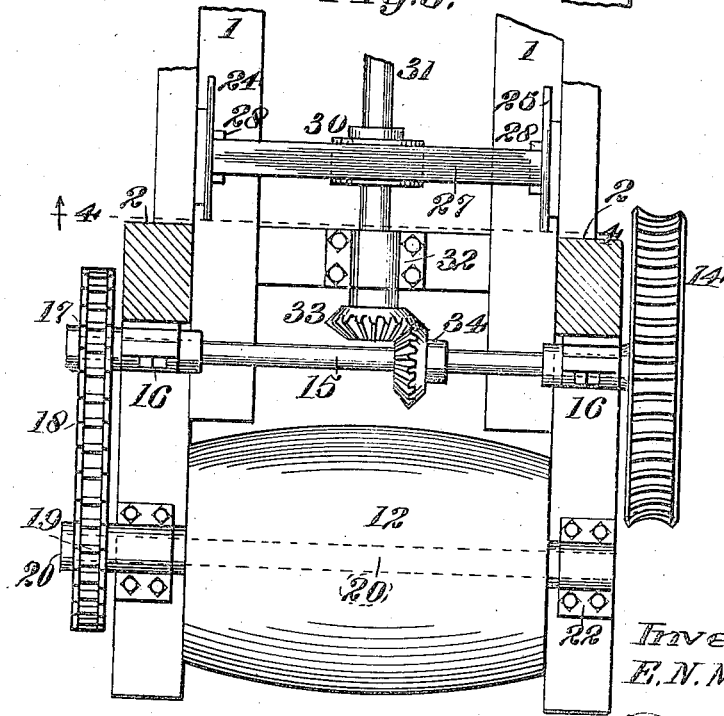

1,461,134

UNITED STATES PATENT OFFICE.

EDWARD N. MAULL, OF ORLANDO, FLORIDA, ASSIGNOR TO SKINNER MACHINERY COMPANY, OF DUNEDIN, FLORIDA, A CORPORATION OF FLORIDA.

BUFFING MACHINE.

Application filed December 13, 1922. Serial No. 606,745.

*To all whom it may concern:*

Be it known that I, EDWARD N. MAULL, a citizen of the United States, residing at Orlando, in the county of Orange and State of Florida, have invented certain new and useful Improvements in Buffing Machines, of which the following is a specification.

This invention relates to a class of machinery designed for the cleaning, buffing or polishing of the surface coatings of citrus fruits and the like, and has for an object buffing means rotatably mounted adjacent traveling conveyor means whereby the globular fruit is conveyed past the buffing, cleaning or polishing means and in contact with said means at interrupted intervals, resulting in the removal of any adhering substance, dust or residue deposited during the time the fruit was on the tree or which it may have accumulated during picking, boxing or cartage to packing house or storage.

The invention is also particularly adapted to the buffing or polishing of citrus fruits such as oranges that have been subjected to a special process, which process is set forth and forms the subject matter of copending applications Serial Numbers 533,485 and 577,412, filed in the United States Patent Office respctively February 1st, 1922, and July 5th, 1922, the subject matter of the applications relating to that step of an invention, wherein the fruit has been given a coating of a preservative or protective substance which adheres to the outer skin surface and tends to exclude various agents of a destructive nature and to a certain extent prevents evaporation of the natural volatile substances contained in the cell structure of the skins.

Inasmuch, therefore, as I have covered this process in a separate application I will bear more specifically in this application on features and advantages naturally inherent in the invention that are anplicable to the varied uses and requirements of a general use machine for buffing, polishing, cleaning or treating articles of a globular shape, or such as will roll under the action of gravity; understanding that oranges or other fruit treated by the process mentioned, or any similar process, would be acted upon in the same manner and by the same mechanisms and adjustments as any of the articles alluded to.

A principal object of this invention is the provision of a suitable machine that will automatically take fruit of varying sizes at the same time, from a hopper or other source of supply and subject each individual unit of fruit to a polishing action administered by high rotative speed buffing rolls and in such a manner that the delicate covering of the fruit is in no wise injured or broken.

A high rotative speed for the buffing rolls is necessary so that the fruit is touched very lightly and rapidly with a very soft yielding material that will effectually polish the outer surface of the fruit and still not produce any abrasive action to injure the delicate outer coating.

Another object of the invention is to provide efficient and reliable automatic means for periodically interrupting the buffing action and thus prevent a too rapid spinning or turning of the fruit that would otherwise be produced by a constant contact with the buffing rolls.

The diameter of these rolls is somewhat more than the diameter of the fruit, take an orange for example, a rotative speed for the buffing rolls of 1200 revolutions per minute is not excessive for efficient results. If the orange is three inches in diameter and was kept in constant contact with a buffing roll, two, three or four times this diameter, it is easily seen that the orange would soon assume destructive rotative speed, and the centrifugal forces set up within the orange due to this speed would likely burst it. It is therefore desirable and necessary to interrupt the buffing action at regular intervals to thus hold down the rotative effect on the fruit. This I accomplish in a very effective manner to be described.

Other objects and advantages will become apparent as the construction and operation are made more manifest by a study of the drawings accompanying this specification and claims.

Reference being now had to the drawings in which like parts are indicated by like reference numbers, Fig. 1 is a plan of the machine showing a series of globular fruit in contact with the buffing rolls and other fruit passing out of the machine. It also shows distinctly the interrupting members under the fruit that is lying against the buffing rolls.

Fig. 2 is a right hand side elevation of Fig. 1, partly in section.

Fig. 3 is an enlarged section of a part of one of the buffing elements showing its construction and arrangements of parts.

Fig. 4 is a sectional elevation on line 4—4 of Fig. 5, showing clearly how the interrupting device controls the fruit in relation to the buffing rolls.

Fig. 5 is a plan partially in section taken on line 5—5 of Fig. 1. In this view the conveyor belt is left off to more clearly illustrate the mechanism for operating the interrupting members.

Figs. 6 and 7 are diagrammatic views illustrating how the proportional speed of the conveyor belt may be varied in relation to the circumferential speed of the buffing rolls.

Numeral 1 indicates a framework on which the mechanism of the machine is mounted. 2 represents supports resting on the floor, (the lower parts being broken away) to which the framework 1 is secured. 3 represents buffing, polishing or cleaning rolls mounted for rotation on shafts 5 and 6, the shafts in turn being mounted in bearings 4 secured to the supports 2.

The shafts 5 and 6 on which the buffing rolls are mounted are directly connected to individual motors 7 and 8 resting on a cross member 9 at the extreme end of the framework 1.

It will be noted that the two buffing rolls 3 are mounted in parallel planes with sufficient lateral separation to permit of placing the conveyor belt 10 between them.

This conveyor belt 10 is supported at one end by a highly crowned pulley 11 and is supported on and driven by a similar crowned pulley 12 at the other end of the machine.

The buffing roll shaft 5 extends beyond the bearing 4 at the exit end of the machine and carries a worm 13 meshing with a worm wheel 14 supported on a cross shaft 15 mounted for rotation in bearings 16 secured to the members 2.

A sprocket 17 is mounted opposite the worm wheel 14 on the shaft 15 and through the chain 18 drives a companion sprocket 19 on the shaft 20, on which shaft 20 is also mounted the crowned pulley 12. The crowned pulley 11 is mounted on shaft 21 supported in suitable bearings 22.

The conveyor belt 10, Fig. 4, is supported by an angularly disposed member 23 so inclined that the center portion of the belt is elevated and the two portions opposite the center are inclined downward toward the buffing rolls, so that the fruit will be impelled by gravity toward the buffing rolls as it is conveyed through the machine.

The interrupting members that periodically intercept the fruit and move it away from the action of the buffing rolls are designated by numerals 24 and 25.

These interrupters are mounted for vertical reciprocation and move between the buffing rolls 3 and the edges of the conveyor belt 10.

They are directly mounted on cross heads 26 and 27, which cross heads have support by means of vertical extensions guided in bearings 28.

A cam roller 29 is mounted centrally in each of the cross heads 26 and 27 and each rides on a separate cam 30, 30, mounted in turn on the longitudinal shaft 31, this shaft being supported in suitable bearings 32, resting on cross members forming part of the framework 1.

The shaft 31 derives rotative motion through a mitre gear 33 mating with a companion gear 34 on shaft 15.

Arranged over the buffing rolls 3, 3, are pipes 35 having perforations 36 on their underside. These pipes are connected to a source of air or liquid supply, not shown, as may be desirable. The medium passing through the pipes is projected tangentially onto the surfaces of the buffing rolls and assists in keeping the surfaces free from dirt or residue accumulated from contact with the fruit during its passage through the machine.

A feed chute 37 is provided as well as exit chutes 38 for delivering fruit 40 to the conveyor and discharging the same from the machine.

The buffing rolls 3, 3, are made up in a well known manner by using discs of felted material, spaced on the shafts with spacing washers between discs as is best shown in Fig. 3. This structure firmly holds the felted discs in spaced relation and produces a buffing surface that is soft and yielding.

Having thus described in detail the structure of a machine embodying my invention, I will now describe in detail its operation.

In describing the operation of this machine we will assume that oranges are being treated. It will be understood, however, that this invention is adapted to buff, clean, polish or treat any globular fruit or any article that will roll under the action of gravity and is therefore not by any means limited to treating oranges or the like.

Previous to starting the movement of fruit into the machine the motors 7 and 8 are set in operation, the motor 7 turning clockwise and the motor 8 turning counter clockwise. We will suppose they are speeded to 1200 revolutions per minute, we will also assume that the worm wheel 14 has 40 teeth and the worm 13 has a single thread.

This combination would turn the shaft 15, 30 revolutions per minute and since the sprockets 17 and 19 are of the same size the shaft 20 carrying the crowned pulley 12 will also rotate 30 turns per minute, this will give the conveyor belt 10 a lineal movement of one-fortieth the circumferential speed of the buffing rolls 3, 3, which will give ample time for the rolls 3, 3 to reach the entire surface of each fruit during its passage through the machine.

I might mention here that while I have shown the sprockets 17 and 19 as of the same size, I can easily vary the proportional size and thereby increase or diminish the lineal speed of the conveyor belt 10.

For instance, if I place a sprocket on shaft 15 of half the size of sprocket 20 the lineal speed of the belt 10 would be reduced one hundred per cent, see Fig. 6, while if I reversed this condition and placed a sprocket of half the size of 19 on shaft 20, the lineal speed of the conveyor belt 10 would be increased one hundred per cent—see Fig. 7.

This structure and manner of drive give me a flexibility of adjustment that will accommodate any possible condition of operation.

I might also mention that I could dispense with the sprockets entirely and substitute a variable speed transmission such as the Reeves variable speed countershaft, which is universally known and used very extensively in all manner of places where variable speeds of machine elements are necessary. With this device the lineal speed of the conveyor belt 10 could be instantly varied while running, and thus be adjusted to meet any required condition.

Mention was made in the forepart of this specification about the interrupting device for periodically moving the fruit away from the action of the buffing rolls 3, 3. This periodic interruption of the buffing action has been found necessary for the reason that if the fruit is permitted to remain in constant contact with the rapidly rotating buffing rolls it will be given such a high rotative speed as will cause or create centrifugal forces within the orange to injure it and even burst it.

Another important advantage develops when the rotative speed of the fruit is kept low in that the buffing or cleaning action is greatly facilitated.

The ideal condition for buffing or cleaning the fruit would be to have each fruit rotate very slowly, in constantly varying planes, with the lightest contact possible with the surface of the buffs, this would give the maximum cleaning effect in the minimum of time and with the least abrasive effect.

I approximate this condition very closely by means of the interrupting device.

As will be noted by reference to the drawings, particularly Fig. 4, this interrupting device comprises flat bars or blades 24 and 25, of any suitable material, arranged to have vertical reciprocation between the buffs 3, 3 and the edges of the conveyor belt 10 so that each time the rounded top edges of the interrupting bars move up they come into contact with the fruit and temporarily move it out of contact with the buffs.

This temporary separation of the fruit from the surface of the buffs permits the fruit to lose practically all of its spinning or rotative effect imparted to it by the 1200 revolution per minute buffs, so that when the bars retreat and the fruit again rolls into contact with the buffs it is practically quiescent as far as rotation or spinning is concerned and by the time it begins to take on rotative motion the interrupting bars again come up and move it away from the buffs.

This interrupting action occurs at regular timed intervals and thus limits the rotative speed of the oranges to a predetermined minimum.

The interrupting bars are actuated through the cams 30, 30, shaft 31 and mitre gears 33 and 34, so that they have one up and one down movement to each revolution of the shaft 15 which we have assumed to be turning 30 revolutions per minute.

This interrupting action, aside from keeping down the rotative speed of the fruit also serves another useful purpose in that the fruit is turned more completely so that all surfaces are brought within the zone of action of the buffs and more thorough cleaning is thereby effected, this together with the change in position brought about by the forward motion imparted by the conveyor belt insures the entire orange being properly treated.

Another important feature develops in this combination and manner of manipulating the fruit.

The skins of many fruits are somewhat delicate and will not submit to a buffing action that is in any manner abrasive.

On account of the interrupting mechanism I am enabled to employ buffs of a very soft and yielding material that will in no manner be abrasive, and am enabled to get a resistant buffing surface through the high rotative speeds setting up centrifugal forces that serve to hold the faces of the buffs up to the work with a very light contact.

This high speed with the soft yielding contact and resulting light pressure gives very effective cleaning and polishing without the least injury to the surface of the fruit.

The fruit is supplied in just sufficient number to move in single file arrangement past the buffing rolls without crowding. This permits each fruit to be fully acted upon and thoroughly cleaned or buffed during its passage through the machine.

The pipes 35 located over the buffs are intended to supply a cleansing medium of some nature to the outer surfaces of the buffs. Compressed air serves most admirably for some purposes, but conditions may arise where a liquid or even an abrasive may be necessary or desirable.

The object of applying a cleaning medium at the surfaces of the buffs is to help keep the fiber ends of the buffs as clean as possible so that whatever the material once removed from the fruit will not be again rubbed onto the fruit.

Centrifugal force will produce a measure of surface cleaning but this may not be sufficient under all conditions, hence the desirability of the assistance of the air under pressure, or some other suitable medium.

It is thought that my description herewith will enable anyone skilled in the art to practice this invention successfully, and while I have described and illustrated the invention in its preferred embodiment I do not wish to be understood as confining or limiting the invention to the exact details of construction and arrangement as shown, but wish to be understood as claiming the invention as broadly as the state of the art will permit.

I claim:—

1. A machine for treating articles, comprising means for moving articles along a predetermined path, a rotating buffer adjacent to said path, and intermittently moving means adjacent to said rotary buffer for moving said articles away from said buffer at predetermined intervals.

2. A machine for treating articles, comprising means for moving articles in single file processional arrangement, a rotating buffer for contacting with said articles and intermittently moving means for periodically disrupting the contact between said articles and said buffer.

3. A machine for treating articles comprising continuously traveling means for moving articles into contact with treating means, intermittently moving means operating between said articles and said treating means for breaking contact between said articles and said treating means.

4. A machine for treating articles comprising continuously traveling means for moving articles, continuously moving treating means for treating articles while being moved by said moving means, intermittently moving disrupting means for breaking the contact between said articles and said treating means.

5. A machine for treating articles comprising continuously traveling means for moving articles in single file processional arrangement, continuously rotating treating means for operating upon said articles as they are moved by said traveling means, intermittently operating disrupting means acting in timed relation with said continuously traveling means and said rotating treating means for controlling the treatment of said articles.

6. A machine for treating articles comprising means for moving articles along a predetermined pathway, article treating means located adjacent to said pathway, and interrupting means adapted for intermittent operation, for removing the articles from in contact with the treating means at timed intervals throughout their travel along said predetermined pathway.

7. A machine for treating articles comprising a continuously traveling conveyor belt for conveying articles, continuously rotating buffing or cleaning means arranged adjacent said conveying belt, interrupting means operating between said belt and said buffing means for periodically interrupting the action of said buffing means on said articles.

8. A machine for buffing oranges and the like, comprising conveying means for carrying oranges along a predetermined pathway, buffing means comprising a rotating member located at one side of said conveying means for buffing said oranges, intermittently operating interrupting means for engaging said oranges and periodically separating them from contact with said buffing means whereby the said buffing is automatically controlled.

9. A machine for buffing or cleaning oranges or the like comprising conveying and buffing means operating in parallel planes, interrupting means operating at approximately a right angle to said conveying and buffing means, whereby oranges passing through said machine in contact with said buffing means are periodically moved away from said buffing means by said interrupting means.

10. A machine for buffing oranges or the like comprising belt conveying means for conveying oranges, buffing means arranged on either side of said conveying means, said buffing means being adapted to contact with oranges while being conveyed, interrupting means operating on said oranges at regular timed intervals to move the same out of contact with said buffing means.

11. In a machine for buffing or cleaning oranges or the like comprising rotating buffing or cleaning rolls mounted in parallel arrangement, a conveyor belt moving between said buffing rolls and adapted to convey oranges past said buffing rolls, reciprocating bars operating in close relation with said buffing rolls for engaging and moving said oranges out of contact with said buffing rolls in timed intervals.

12. In a machine for buffing or cleaning oranges or the like, buffing rolls mounted on shafts for rotation in parallel relation, an individual motor for driving each of said buffing rolls, a worm carried by one of said roll shafts, a worm wheel mounted on a shaft and meshing with said worm, a sprocket on said worm wheel shaft, a chain leading to another sprocket on a companion shaft, a pulley on said latter shaft, said pulley supporting one end of a conveyor belt, a similar pulley at the opposite end of the machine for supporting the other end of said conveyor belt, a longitudinal shaft driven from said worm shaft, interrupting means operated from said longitudinal shaft for periodically moving oranges laterally away from said buffing rolls.

13. In a machine for buffing oranges or the like comprising a conveyor for moving oranges through the machine, buffing rolls for treating said oranges, cleaning means for said buffing rolls and interrupting means for controlling the buffing action on said oranges.

14. In a machine for buffing or cleaning oranges or the like comprising buffing means, conveying means, interrupting means for controlling the buffing action on said oranges, and cleaning means for said buffing means together with power means for making all the operations automatic.

15. In a machine for buffing or cleaning oranges or the like comprising rotating buffing means, a conveyor belt, for conveying oranges past said buffing means, said conveyor belt having a lineal speed that is less than the circumferential speed of said buffing rolls and interrupting means operating in conjunction with said conveyor belt for moving said oranges out of operative contact with said buffing rolls in timed intervals.

16. In a machine for buffing and cleaning oranges or the like comprising a horizontal continuously moving conveyor belt, horizontally disposed buffing rolls arranged to rotate adjacent said conveyor belt, interrupting means having vertical reciprocation adjacent said buffing rolls and said conveyor belt for periodically engaging oranges on said conveyer belt and moving same away from operative contact with said buffing rolls.

In testimony whereof I have signed my name to this specification.

EDWARD N. MAULL.